Oct. 17, 1950  R. L. JEAN-BAPTISTE SANMORI  2,526,282
FOUR WHEEL STEERING SYSTEM FOR VEHICLES
Filed Feb. 12, 1946  3 Sheets-Sheet 1
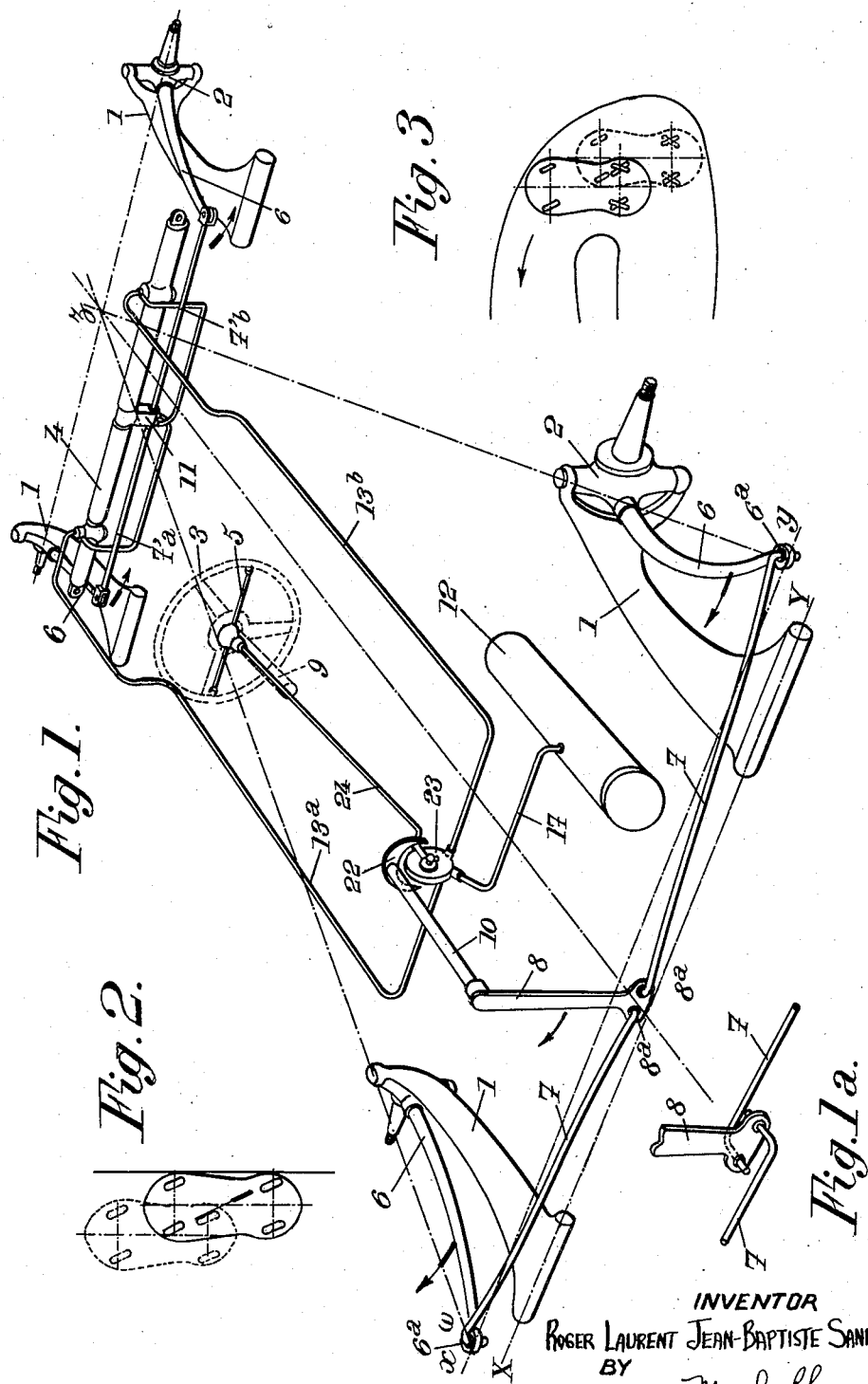
INVENTOR
ROGER LAURENT JEAN-BAPTISTE SANMORI
BY
Mock & Blum
ATTORNEYS

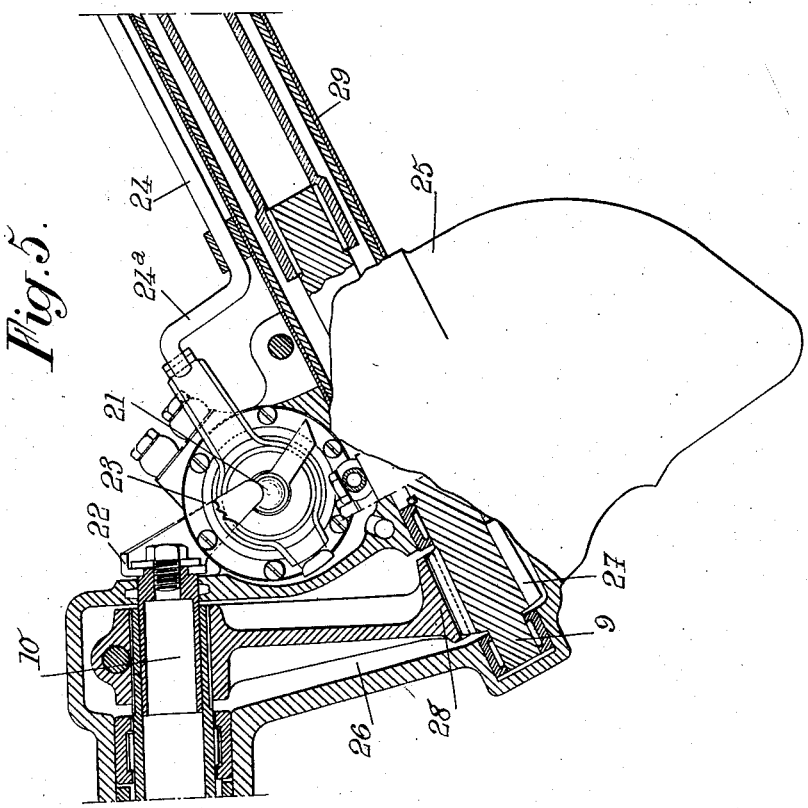
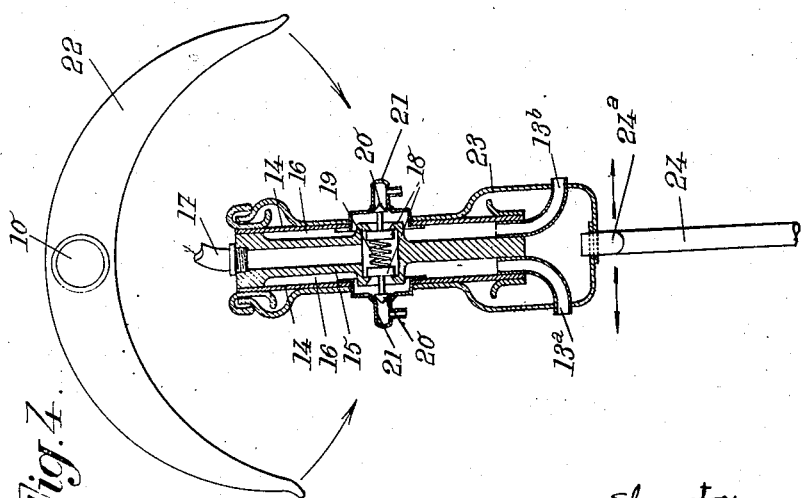

Patented Oct. 17, 1950

2,526,282

UNITED STATES PATENT OFFICE 2,526,282

FOUR-WHEEL STEERING SYSTEM FOR VEHICLES

Roger Laurent Jean Baptiste Sanmori, Monaco, Monaco

Application February 12, 1946, Serial No. 647,164
In France September 12, 1945

7 Claims. (Cl. 180—79.2)

1

The present invention relates to steering systems for vehicles and it is more especially, although not exclusively, concerned with automobile vehicles and more particularly touring cars.

The object of my invention is to provide a steering system which is better adapted to meet the requirements of practice than those used up to the present time.

A preferred embodiment of my invention will be hereinafter described with reference to the accompanying drawings, given merely by way of example and in which:

Fig. 1 is a diagram showing, in perspective view, a steering system made according to the invention for a four wheel automobile vehicle;

Fig. 1a is a detail view corresponding to a modification;

Figs. 2 and 3 are explanatory diagrams illustrating my invention;

Fig. 4 is a transverse sectional view of a fluid distributing device included in the steering system;

Fig. 5 is a vertical sectional view of a portion of the steering system shown by Fig. 1;

Figure 6:
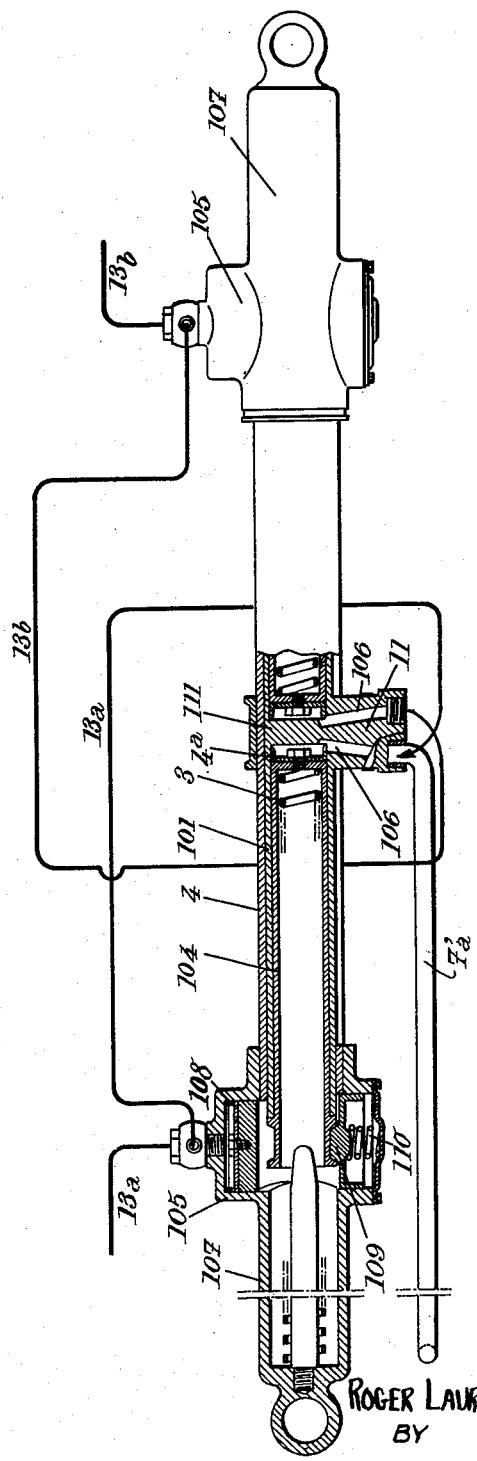
Fig. 6 is a sectional view of the servo-motor shown in Fig. 1.

In the embodiment of my invention shown by the drawings, it has been supposed, by way of example, that the steering system is intended for a four-wheel motor car (it being well understood that it is applicable to any vehicle having a front wheel set and a rear wheel set, each set including at least one wheel). The wheels are for instance mounted at the respective ends of oscillating longitudinal levers 1. The free end of each of said levers is fork-shaped to form a vertical journal in which is pivoted a stub axle carrier 2 for the corresponding wheel and eventually a driving shaft element if the wheel in question is both a steering and a driving wheel.

According to my invention, I provide manual means, advantageously operated by a steering wheel 3, for enabling the driver directly to impart steering displacements to one of the wheel sets, for instance the front one as it will be hereinafter supposed. The steering displacements of the other wheel set, i. e. the rear one in the above mentioned case, are ensured by a servo-motor 4 which is controlled either by steering wheel 3 or by an independent control part.

According to a feature of my invention, servo-motor 4 is operated by the steering gear controlled by steering wheel 3 only when the steering angle of the front wheels exceeds a given

2 value, whereas, as long as this steering angle is below said value, said servo-motor remains locked in neutral position, or is brought back to said position.

Such an arrangement has many advantages over systems having either only one steering wheel set or two steering wheel sets permanently interconnected so that their respective steering displacements always take place in opposed directions.

With the arrangement according to the present invention, as long as the vehicle is taking ordinary corners, that is to say corners of relatively long radii, so that the steering angle of the front wheels remains below a given limit value, the rear wheels remain locked in neutral position and the vehicle acts exactly as an ordinary car with front steering wheels. But as soon as it becomes necessary to corner more sharply so that the steering angle of the front wheels becomes at least equal to the above mentioned limit value, servo-motor 4 is automatically brought into action and gives the rear wheels steering displacements in a direction opposed to that of the front wheels so as to reduce the radius of the curve started by the initial steering displacement of the front wheels.

As a consequence of this, I can reduce the maximum steering angle of each wheel to a value smaller than that adopted in conventional construction while keeping the possibility of very sharp cornering. For instance, it will be possible to comply with the usual requirements of practice with front wheels having limit steering angles of 21° outwardly and 25° inwardly and rear wheels having limit steering angles of 18° outwardly and 21° inwardly, the whole corresponding to a total steering angle of 39° outwardly and 46° inwardly, while, for a vehicle of conventional construction with only steering front wheels, the corresponding angles are only about 30° and 36°. Of course, these numerical values are given merely by way of indication.

This reduction of the limit steering angles of the wheels has, of course, many advantages, but in the case, according to the invention, of the steering displacements of the rear wheels being produced by a servo-motor, a further advantage is obtained in that it suffices, once the limit steering angle of the front wheels has been reached, to impart very small supplementary displacements to the steering wheel for adjusting the amount of energy fed to the servo-motor and thus controlling the steering displacements of the rear wheels to ensure shorter and shorter radii of cornering.

Furthermore, as the control of the servo-motor does not require any rigid transmission part as would be necessary if the four steering wheels were mechanically interconnected, the vehicle frame can be made to extend to a very short distance from the ground.

The steering system according to my invention further has, over steering systems in which the four wheels are constantly playing a steering part, the advantage of improving the stability of the vehicle at cruising speed and high speeds, owing to the fact that the rear wheels are then locked in neutral position, and that of facilitating the handling of the vehicle in certain cases, for instance for moving away from a sidewalk, an operation which is particularly difficult when the four wheels are constantly in action as steering elements and accordingly given steering displacements in opposite directions.

Finally, owing to the provision of an independent control element 5 for operating servo-motor 4, it is always possible, with the system according to my invention, and whatever be the steering angle imparted to the front wheels, to obtain without any effort, a controlled steering displacement of the rear wheels, either in a direction opposed to the steering displacement of the front wheels or in the same direction. This possibility enables the driver to perform numerous combinations of steering displacements of the front and rear wheels, which greatly facilitate the handling of the vehicle and even permits new operations impossible with vehicles of the conventional construction, such for instance as illustrated by Figs. 2 and 3.

In the case of Fig. 2, the vehicle can easily be moved away from a sidewalk, by pivoting the four steering wheels in the same direction.

In the case of Fig. 3, a hairpin corner is negotiated by first turning the front and rear wheels in opposite directions, then reversing gear while also reversing the steering angle of the rear wheels (which are then turned in the same direction as the front wheels) without having to straighten up the front wheels by a painful rotation of the steering wheel as it is the case with a motor car of conventional construction, and finally starting again in frontward direction after having again turned the rear wheels into a direction opposed to that of the front wheels. In the course of these operations the driver practically does not modify the steering angle of the front wheels.

Concerning the steering gear for controlling the front wheels directly from steering wheel 3, it is advantageously made as follows.

The wheels are supported by levers 1 oscillating each in a vertical longitudinal plane about an axis XY perpendicular to the longitudinal axis of the vehicle.

The steering movements of each wheel are controlled by a lever 6 rigid with the corresponding stub axle carrier 2, said lever 6 extending in a direction substantially parallel to that of the corresponding oscillating arm 1 and being located on the same side of part 2 as said arm.

Each of these levers 6 is actuated by a transverse link 7. For instance, as shown by the drawing, the outer end of each link 7 is connected to the free end of the corresponding lever 6, for instance by means of a pin engaged in an eye 6a of vertical axis provided in said lever end (advantageously with the interposition of an elastic sleeve in this joint), while the inner end of said link 7 is connected to the lower end of a substantially vertical central control arm 8. Both of the links 7 are pivotally connected to arm 8 through pins engaged in eyes 8a, of horizontal axes, provided in said arm 8, advantageously with the interposition of an elastic sleeve in these joints.

Between the shaft 9 of steering wheel 3 and control arm 8, I provide transmission means for imparting to control arm 8 oscillations of an amplitude corresponding to the angular displacements of the steering wheel. Said means may for instance include bevel gear means 27—28 (see Fig. 5) interposed between the lower end of shaft 9 and a substantially horizontal transmission shaft 10 rigid with the upper end of control arm 8.

The relative dimensions and positions of the above mentioned elements are preferably chosen as follows, advantage being taken of the fact that the amplitudes of oscillation of parts 2 relatively small:

Eyes 6a are both on a line $xy$ located in the vertical plane of axis XY and above the latter. Furthermore, each of them is located on line $wz$ of the steering diagram, a theoretical line which, according to conventional solutions, passes through the pivot axis of the corresponding wheel and the middle point of the axis of the rear wheels.

Eyes 8a are located between axes XY and $xy$ and as close as possible to XY, eventually on XY itself. Thus the relative displacements of eyes 6a with respect to eyes 8a in the vertical direction, in response to oscillations of levers 1 about axis XY when the suspension system is working, do not substantially influence the distance between two eyes 6a and 8a corresponding to the same link 7, and anyway the slight variations that may occur in this distance are absorbed by the elastic sleeves provided in the joints.

This positioning of the eyes in question in the vertical plane of XY involves a relatively great length of levers 6, substantially equal to that of ams 1, which is possible only because, as above explained, the wheel steering amplitude is smaller than in a car of conventional construction. Furthermore, arms 1 need not be given too considerable a curvature so that it is not necessary to give stub axle carriers 2 an unfavorable overhanging position for permitting the maximum inward steering pivoting of said parts 2 to take place freely.

Furthermore, owing to the fact that levers 6 are relatively long although the displacements of their ends are of comparatively small amplitude, steering rods 7 still act on said levers 6 at a satisfactory angle when the steering angle is maximum, whereas, in motor cars of conventional construction, the moment with respect to the steering pivot axis of the wheel, of the effort transmitted to the steering levers by the transmission rods decreases considerably when the steering angle comes near to its limit value, which corresponds, for the driver, to the necessity of exerting an increased effort on the steering wheel when the steering angle of the front wheels is important.

This important length given to levers 6 further involves an important reduction of the reactions exerted by the wheels, when they undergo accidental pivoting displacements of small amplitude due to inequalities of the ground on the joints of the steering gear.

Advantageously, according to the modification illustrated by Fig. 1a, link rods 7 may be crossed at their inner ends, where they are connected with arm 8. This arrangement makes it possible, while maintaining a correct steering diagram, to dispense with the obliquity of levers 6 along line wz. In this modification, the line in question becomes parallel to the longitudinal axis of the car and the overlapping of links 7 that is thus produced permits of reducing the transverse overall dimension of the steering gear.

Preferably, a supplementary reduction ratio is obtained for the steering gear by giving central control arm 8 a length smaller than that of levers 6, for instance one half thereof.

This steering gear is simple, strong, easy to take to pieces, precise due to the length of levers 6, efficient for all values of the steering angles and fully symmetrical.

Concerning now the control of the steering displacements of the rear wheels by servo-motor 4, it is obtained, for instance, by connecting the driven part 11 of this servo-motor with the stub axle carriers of the rear wheels through connecting means preferably similar to the corresponding portion of the front wheel set steering gear. These connecting means consist for instance of transverse rods 7' pivotally connected with longitudinal levers 6' rigid with said stub axle carriers 2, these levers 6' being mounted and dimensioned similarly with the levers 6 that cooperate with the front wheels.

The servo-motor proper is preferably made of a type such that, in the neutral position thereof, its driven element 11 is temporarily locked, thus ensuring an automatic locking of the rear wheels in neutral position for all conditions of operation of the vehicle for which said rear wheels need not be given steering displacements.

Advantageously, I make use of a double acting servo-motor of the type described in my copending U. S. patent application bearing Serial No. 647,165 filed on February 12, 1946. This servo-motor is constituted by the combination of two single acting jacks mounted in opposition, with the driven element 11 carried by a part (for instance the cylinder) common to these two jacks, the whole being slidable in an outer casing 4 such as visible on Figs. 1 and 6. Each of the end portions 4a&4b of casing 4 is provided with fixation means, for instance rings, through which said casing 4 can be secured to a fixed part of the vehicle. The driven element 11 of the jack is connected to the free ends of the levers 6 of the rear wheels through rods 7'a—7'b. Springs 103 interposed between the ends of pistons 104 and the end portions 4a&4b of casing 4 urge said pistons toward their inner positions, where the variable volume chambers of the elementary jacks are reduced practically to zero. In these positions, the pistons are locked by locking means constituted by projections 109 engaging in annular grooves 107 of pistons 104, said projections being carried by pistons 108 slidable in cylinders 105 formed integral with end portions 4a, 4b. Springs 110 urge said projections toward said grooves 107. On the contrary, the feed of a fluid under pressure to the top part of cylinder 105 disengages projection 109 from groove 107 against the action of said spring, thus releasing the corresponding piston 104. In neutral position, the pistons 104 of the jacks are thus practically applied against the central partition 111 of the cylinder formed by element 11 and both of these pistons are locked in these respective positions. The individual jacks are operated by a fluid under pressure, for instance air, fed thereto through two circuits 13a and 13b, respectively, each circuit being connected to the inlet 106 of the variable volume chamber of one jack and also to the top of the cylinder 105 belonging to the means for locking the piston of the other jack. The servo-motor is therefore operated by means of a distributing device for connecting one or the other of said circuits 13a, 13b with a compressed air reservoir 12 and the other with the atmosphere.

According to my invention as above set forth, this distributing device is adapted to be operated both by steering wheel 3, when the steering angle of the front wheels is at least equal to a given limit value, and by control member 5, at any time whatever.

An embodiment of such a combination is illustrated by Figs. 4 and 5. It includes a rigid central box having two substantially parallel walls 15 and connected with the compressed air reservoir 12 by a conduit 17. Walls 15 are provided with respective holes in line with each other and fitted with valves 18 opening toward the inside of said box, a common spring 19 for instance urging said valves 18 toward their seats. Two elastic membranes or other deformable walls 14 form with said walls 15 two chambers 16 located on opposite sides of the rigid box. One of these chambers 16 is in communication with circuit 13a and the other with circuit 13b.

Each of the above mentioned valves 18 carries a needle valve 20 adapted to cooperate with a seat 21 in communication with the atmosphere and carried by the corresponding membrane 14 in such manner that normally said needle valve 20 is at a distance from its seat.

In order to feed compressed air to one of the circuits 13a, 13b through this distributing device, it suffices to push toward walls 15 the valve seat 21 of the chamber 16 that is in communication with said circuit. This action deforms the elastic membrane 14 by which the seat 21 in question is carried, so that said seat first comes into contact with its valve 20, thus closing any communication between the chamber 16 in question and the atmosphere, then pushes the corresponding valve 18 away from its seat, thus placing this chamber 16 in communication with the inside of the rigid box, which is itself connected with the compressed air reservoir. The circuit in question, say 13b, is thus brought into communication with the source of compressed air, while the other circuit remains in communication with the atmosphere as long as no thrust is exerted on the valve seat 21 thereof toward walls 15.

In order to subject this distributing device to the action of both steering wheel 3 (for displacements of the latter corresponding to a steering angle of the front wheels at least equal to a limit value) and control member 5 (whenever desired by the driver), I provide, on the one hand, a double curved arm or lever 22 and, on the other hand, a flexible casing 23.

Lever 22 is fixed on the shaft 10 of the steering gear so that, whenever the angular displacement of the steering wheel exceeds a given value in one direction or the other, one end of said lever comes into contact with the corresponding valve seat 21 and pushes it toward walls 15.

As for flexible casing 23, it is mounted on membranes 14, so as to permit of suitably deforming them, and it is operatively connected with control member 5.

For instance, as shown by the drawing (Figs. 1, 4 and 5), this control member is constituted by a lever 5 extending in a plane diametral with respect to steering wheel 3, at a short distance under said steering wheel, so that it can be easily actuated by the fingers of the driver's hands resting on said steering wheel. This lever is movable about the axis of the steering wheel on either side of a substantially horizontal neutral position.

Lever 5 is connected with flexible casing 23 through a kind of crank constituted by a bar 24 (parallel to the steering wheel shaft and journalled in bearings carried by the steering column 29 that surrounds said shaft) and an arm 24a, so that angular displacements imparted to lever 5 on either side of its neutral position cause arm 24a to rotate about the axis of bar 24 and to deform flexible casing 23, thus bringing either of valve seats 21 into contact with the corresponding needle valve 20. Owing to the torsional elasticity of bar 24, the efforts transmitted to casing 23 are limited to values compatible with the mechanical resistance of said casing and of the membranes 14 by which it is supported.

This device works as follows:

When the front wheels have been turned, in one direction or the other, to the limit steering angle, double lever 22 comes into contact with one of the valve seats 21 (the one that controls the circuit that causes the rear wheels to be turned in a direction opposed to that in which the front wheels have been turned for steering purposes). From this time on, this circuit is fed with fluid under pressure, thus causing the rear wheels to be displaced as above explained and the driver, through his action on steering wheel 3, can control the thrust applied on the deformable wall 14 that supports the valve seat in question, so as to determine the pressure fed to the servo-motor and, consequently, the steering angle of the rear wheels. Owing to the elasticity of the transmission means, this control is exerted with a high precision. As soon as the driver releases steering wheel 3 for straightening up the vehicle after a corner, the rear wheels are gradually brought back into neutral position, where they are locked due to the locking of servo-motor 4 in its neutral position.

It is pointed out that these operations do not require from the driver any reflex different from those corresponding to the driving of a car of conventional type.

Steering displacements of the rear wheels can be obtained independently by the driver, whatever be the value of the steering angle of the front wheels, by acting on lever 5. It is even possible, in certain cases, for instance at low speed, to pilot the vehicle merely by means of this lever 5, steering wheel 3 then remaining in neutral position.

According to a preferred construction, more particularly illustrated by Fig. 5, all the elements of the distributing device and the means for operating it are grouped in a casing 25 provided at the bottom part of the steering column.

This casing 25 includes a fluidtight chamber 26 in which are housed a bevel pinion 27 keyed on the steering wheel shaft 9 and a toothed segment 28 in mesh with said pinion and keyed on shaft 10, the rear end of which is journalled in the wall of said chamber 26.

The above mentioned distributing device is housed in casing 25 with its axis (which coincides with the common axis of valves 18 and 20 and valve seats 21) positioned in such manner that, for angular displacements of sufficient amplitude of double lever 22, one end of said lever comes into contact with one of said valve seats 21.

As above explained, the cranked end of torsion bar 24 is pivotally connected to flexible casing 23.

With a steering system of the type above described, a high degree of safety is ensured because, in case of leakage in one of the circuits of the servo-motor, the latter automatically returns into neutral position and remains locked in this position, thus keeping the rear wheels in planes parallel to the longitudinal plane of symmetry of the vehicle.

Furthermore, the steering gears for the front and rear wheel sets include identical elements for the type of suspension that is considered, which permits of reducing the cost of manufacture of the whole.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. For use in a vehicle including a front wheel set and a rear wheel set, all the wheels being steering wheels, a steering system which comprises, in combination, manual means for imparting steering displacements to one wheel set, servo-motor means for imparting steering displacements to the other wheel set, a device for controlling said servo-motor, means operatively connected with said manual means for operating said control device in response to a prior predetermined steering displacement of said first mentioned wheel set, and manual means for independently operating said control-device.

2. For use in a vehicle including a front wheel set and a rear wheel set, all the wheels being steering wheels, a steering system which comprises, in combination, a steering gear for imparting to one wheel set the desired steering displacements, manual means for operating said steering gear, a servo-motor for imparting steering displacements to the other wheel set, a device for controlling said servo-motor, means operatively connected with said steering gear for operating said control device when the steering angle of the first mentioned wheel set exceeds a given value, and manual means for independently operating said control device.

3. For use in a vehicle including a front wheel set and a rear wheel, all of said wheels being steering wheels, a steering system which comprises, in combination, a steering gear for imparting to one wheel set the desired steering displacements, manual means for operating said steering gear, a fluid operated servo-motor for imparting steering displacements to the other wheel set, said servo-motor including two feed circuits to be connected one with a source of fluid under pressure and the other with a discharge space, for operation of said servo-motor in one direction or the other, and to be connected both with said discharge space for the neutral position of said servo-motor, a source of fluid under pressure, distributing means for simultaneously connecting either of said circuits with said source and the other with said discharge space, said distributing means being adapted, in neutral position thereof, to connect both circuits with said discharge space, means operatively connected with said steering gear for operating said distributing means when the steering angle of the first mentioned wheel set exceeds a given value, and manual means for independently operating said distributing means.

4. For use in a vehicle including a frame, a front wheel set and a rear wheel set mounted on said frame, all of said wheels being steering wheels, a steering system which comprises, in combination, a steering gear for imparting to one wheel set the desired steering displacements, manual means for operating said steering gear, a fluid operated servo-motor for imparting steering displacements to the other wheel set, said servo-motor including two feed circuits to be connected one with a source of fluid under pressure and the other with a discharge space, for operation of said servo-motor in one direction or the other, and to be connected both with said discharge space for the neutral position of said servo-motor, a source of fluid under pressure, a rigid box, a conduit connecting said box with said source, said box being provided with holes in opposite walls thereof, two opposed valves mounted in said holes opening toward the inside of said box, elastic means for resiliently opposing the opening of said valves, means, including two deformable walls substantially parallel to said first mentioned walls, forming two chambers on opposite sides of said box located adjacent to said two first mentioned walls respectively, a conduit connecting each of said chambers with one of said circuits respectively, said deformable walls being provided with discharge orifices opening to the atmosphere, two valves in said respective chambers rigid with said first mentioned valves respectively adapted to control said orifices, each of said deformable walls being so arranged as to keep, in its position of equilibrium, its discharge orifice unobstructed by the corresponding second mentioned valve, and to cause, when deformed toward said rigid box, its discharge orifice to be closed by the corresponding second mentioned valve and the corresponding first mentioned valve to be opened, means operatively connected with said steering gear for deforming said deformable walls toward said box for steering angles of the first mentioned wheel set exceeding a given value, and separate manual means for independently deforming said deformable walls toward said box.

5. For use in a vehicle including a frame, a front wheel set and a rear wheel set mounted on said frame, all of said wheels being steering wheels, a steering system which comprises, in combination, a steering gear for imparting to one wheel set the desired steering displacements, manual control means pivoted to said frame for operating said steering gear, a fluid operated servo-motor for imparting steering displacements to the other wheel set, said servo-motor including two feed circuits to be connected one with a source of fluid under pressure and the other with a discharge space, for operation of said servo-motor in one direction or the other, and to be connected both with said discharge space for the neutral position of said servo-motor, a source of fluid under pressure, a rigid box, a conduit connecting said box with said source, said box being provided with holes in opposite walls thereof, two opposed valves mounted in said holes opening toward the inside of said box, elastic means for resiliently opposing the opening of said valves, means, including two deformable walls substantially parallel to said first mentioned walls, forming two chambers on opposite sides of said box located adjacent to said two first mentioned walls respectively, a conduit connecting each of said chambers with one of said circuits respectively, said deformable walls being provided with discharge orifices opening to the atmosphere, two valves in said respective chambers rigid with said first mentioned valves respectively adapted to control said orifices, each of said deformable walls being so arranged as to keep, in its position of equilibrium, its discharge orifice unobstructed by the corresponding second mentioned valve, and to cause, when deformed toward said rigid box, its discharge orifice to be closed by the corresponding second mentioned valve and the corresponding first mentioned valve to be opened, means operatively connected with said steering gear for deforming said deformable walls toward said box for steering angles of the first mentioned wheel set exceeding a given value, a manually operative control part pivoted to said frame coaxially with said manual control means and in close vicinity therewith so as to be operable by the fingers of the driver's hands resting on said manual control means, and means operatively connected with said control part for independently deforming said deformable walls in response to displacements of said control part.

6. For use in a vehicle including a frame, a front wheel set and a rear wheel set mounted on said frame, all of said wheels being pivotally connected to said frame for steering purposes, a steering system which comprises, in combination, a steering gear for imparting to the front wheel set the desired steering displacements including a steering shaft located in a longitudinal plane of the vehicle, a manually operated steering wheel for operating said steering gear, a fluid operated servo-motor for imparting steering displacements to the other wheel set, said servo-motor including two feed circuits to be connected one with a source of fluid under pressure and the other with a discharge space, for operation of said servo-motor in one direction or the other, and to be connected both with said discharge space for the neutral position of said servo-motor a source of fluid under pressure, a rigid box having two opposed walls substantially parallel to said shaft, a conduit connecting said box with said source, said box being provided with respective holes in said walls thereof, two opposed valves mounted in said holes opening toward the inside of said box, elastic means for resiliently opposing the opening of said valves, means, including two deformable walls substantially parallel to said first mentioned walls, forming two chambers on opposite sides of said box located adjacent to said two first mentioned walls respectively, a conduit connecting each of said chambers with one of said circuits respectively, said deformable walls being provided with discharge orifices opening to the atmosphere, two valves in said respective chambers rigid with said first mentioned valves respectively adapted to control said orifices, each of said deformable walls being so arranged as to keep, in its position of equilibrium, its discharge orifice unobstructed by the corresponding second mentioned valve, and to cause, when deformed toward said rigid box, its discharge orifice to be closed by the corresponding second mentioned valve and the corresponding first mentioned valve to be opened, a curvilinear double arm rigid with said shaft adapted to bear through its respective ends against said deformable walls respectively in response to rotations of said shaft in one direction or the other corresponding to steering angles exceeding a given value, a lever pivoted to said steering shaft about the axis thereof, adapted to be actuated by the fingers of the driver's hand resting on said steering wheel, and a crank rigid with said lever for imparting independent deformations to said deformable walls in response to angular displacements of said lever about the axis of said steering wheel.

7. A fluid distributing device which comprises, in combination, a rigid box, a fluid inlet opening into said box, said box being provided with holes in opposite walls thereof, two opposed valves mounted in said holes opening toward the inside of said box, elastic means for resiliently opposing the opening of said valves, means, including two deformable walls substantially parallel to said first mentioned walls, forming two chambers on opposite sides of said box located adjacent to said two first mentioned walls respectively, two fluid outlets starting from said chambers respectively, said deformable walls being provided with discharge orifices opening to the atmosphere, two valves in said respective chambers rigid with said first mentioned valves respectively adapted to control said orifices, each of said deformable walls being so arranged as to keep, in its position of equilibrium, its discharge orifice unobstructed by the corresponding second mentioned valve, and to cause, when deformed toward said rigid box, its discharge orifice to be closed by the corresponding second mentioned valve and the corresponding first mentioned valve to be opened, and means for imparting to said deformable walls deformations at least toward said rigid box.

ROGER LAURENT JEAN
BAPTISTE SANMORI.

REFERENCES CITED

The following references are of record in the file of this patent:

UNITED STATES PATENTS

| Number | Name | Date |
|---|---|---|
| 745,226 | Mott | Nov. 24, 1903 |
| 867,282 | Macfarren | Oct. 1, 1907 |
| 1,240,458 | Kittredge | Sept. 18, 1917 |
| 1,704,710 | Murray et al. | Mar. 12, 1929 |
| 1,866,393 | Brooks | July 5, 1932 |
| 2,132,828 | Montambo | Oct. 11, 1938 |
| 2,178,073 | Hardy | Oct. 31, 1939 |
| 2,247,985 | Borgward | July 1, 1941 |